United States Patent [19]

Weinle et al.

[11] Patent Number: 4,840,832
[45] Date of Patent: Jun. 20, 1989

[54] MOLDED AUTOMOBILE HEADLINER

[75] Inventors: Paul L. Weinle, Charlotte; Vernon C. Smith, Huntersville; Christopher H. Gardner, Charlotte; Clarence A. Peoples, Jr., Rockwell, all of N.C.; Matthew R. Pierce, Troy, Mich.

[73] Assignee: Collins & Aikman Corporation, New York, N.Y.

[21] Appl. No.: 65,898

[22] Filed: Jun. 23, 1987

[51] Int. Cl.⁴ .............................. B32B 3/00; B32B 3/26
[52] U.S. Cl. ................................ 428/156; 296/39.1; 296/214; 428/157; 428/159; 428/246; 428/247; 428/280; 428/283; 428/288; 428/296; 428/360; 428/373
[58] Field of Search ............. 296/214, 39 R; 428/156, 428/157, 159, 246, 247, 280, 283, 288, 296, 360, 373

[56] References Cited

U.S. PATENT DOCUMENTS

| | | |
|---|---|---|
| 2,331,321 | 10/1943 | Heaton . |
| 3,265,530 | 8/1966 | Marzocchi et al. . |
| 3,341,394 | 9/1967 | Kinney . |
| 4,195,112 | 3/1980 | Sheard et al. ............ 428/288 |
| 4,320,167 | 3/1982 | Wishman ................ 428/288 |
| 4,352,522 | 10/1982 | Miller ................... 296/214 |
| 4,363,848 | 12/1982 | Le Duc et al. .......... 428/286 |
| 4,420,526 | 12/1983 | Schilling et al. ........ 428/296 |
| 4,445,954 | 5/1984 | Adams et al. ........... 156/148 |
| 4,451,315 | 5/1984 | Miyazaki ............... 156/220 |
| 4,474,846 | 10/1984 | Doerer et al. .......... 428/288 |
| 4,476,183 | 10/1984 | Holtrop et al. ......... 428/288 |
| 4,477,516 | 10/1984 | Sugihara et al. ........ 428/296 |
| 4,490,425 | 12/1984 | Knoke et al. .......... 428/288 |
| 4,536,440 | 8/1985 | Berg .................... 428/296 |
| 4,539,252 | 9/1985 | Franz ................... 428/288 |
| 4,600,621 | 7/1986 | Maurer et al. ......... 428/121 |
| 4,610,478 | 9/1986 | Tervol ................. 296/214 |

FOREIGN PATENT DOCUMENTS 1149270 4/1969 United Kingdom .

Primary Examiner—William J. Van Balen
Attorney, Agent, or Firm—Bell, Seltzer, Park & Gibson

[57] ABSTRACT

This invention relates to an automobile headliner which is formed from a batt of polymeric fibers compressed and molded into a predetermined contoured shape. The headliner is characterized by being of a highly deformable resilient construction to facilitate installation in the vehicle. More specifically, the fibers forming the batt are bonded together at a multiplicity of locations which impart a self-supporting molded rigidity which allows the headliner to retain its shape in the installed condition in the vehicle, yet rendering the same highly deformable and resilient to allow it to be rolled or folded upon itself during installation and to thereafter resiliently recover to its original molded shape.

25 Claims, 2 Drawing Sheets

MOLDED AUTOMOBILE HEADLINER

BACKGROUND OF THE INVENTION

This invention relates to an automobile headliner, and more particularly to an automobile headliner which is formed from a batt of polymeric fibers compressed and molded into a predetermined contoured shape.

The headliner of an automobile is mounted to the interior (underside) of the vehicle roof and serves to present an aesthetically pleasing finished appearance to the ceiling of the passenger compartment. A further important function of the headliner is to impart acoustical and thermal insulation. In recent years, significant emphasis has been placed on the sound deadening properties of the headliner, and various headliner constructions have been proposed which seek to provide good sound deadening properties, and meet the other demanding requirements of a headliner, as exemplified for example in the following recent U.S. Pat. Nos.: 3,265,530, 4,352,522, 4,363,848, 4,420,526, 4,476,183, 4,539,252, 4,600,621, and 4,610,478.

Two basic types of headliner construction have been most widely used. One construction utilizes a batt of glass fibers impregnated with a thermosetting resin. The resin impregnated batt is compression molded into the desired headliner shape, and the resin is cured to maintain the fibers in the molded shape. A thin layer of foam, such as polyurethane, overlies the molded fiberglass batt, and a fabric is attached to the foam to form the exposed interior surface of the headliner.

The other predominant type of construction utilizes a rigid core of a foam material such as polyurethane or polystyrene, which is also surfaced with a thin flexible foam cushioning layer, and a fabric surface layer.

The fiberglass headliner has been widely used in American cars since the late 70's and provides good acoustical insulation. However, a significant limitation of the fiberglass headliner is its brittleness. Because of the relative inflexibility and brittleness of the fiberglass headliner, it is easily fractured or broken during shipment from the manufacturing site to the vehicle assembly plant. The headliner is also subject to damage or breakage during installation, since any significant bending or flexing of the headliner would result in breakage or in a permanent crease. Accordingly, care must be exercised in installing the headliner. Its size and rigidity requires that it be installed through a large opening such as the windshield or rear window opening prior to installation of the glass. Similar problems are encountered with rigid foam headliners.

A further problem with fiberglass headliners is that the glass fibers tend to irritate the skin of workers who must handle the headliners.

With the foregoing in mind, it is a primary object of the present invention to overcome the shortcomings and limitations of the prior headliner constructions.

More particularly, it is an object of this invention to provide a headliner having good acoustical and thermal insulating properties, and which is more resilient and flexible than existing headliner constructions so as to facilitate installation in the vehicle and avoid the problem of damage and breakage during shipment and installation.

SUMMARY OF THE INVENTION

The headliner of the present invention is a textile-based product formed from a batt of polymeric fibers compressed and molded into the desired headliner shape. The fibers of the batt are bonded together at a multiplicity of locations to impart to the panel a self-supporting molded rigidity to allow the headliner to retain its shape in the installed condition in the vehicle, yet rendering the panel highly deformable and resilient to allow it to be flexed during installation and thereafter to recover resiliently to its original molded shape.

The polymeric fibers of the batt preferably include potentially adhesive binder fibers which are thermally activated during the molding of the batt to bond together the fibers of the batt at their crossover points, thereby maintaining the batt in its molded shape while providing resiliency and flexibility to the batt. Especially suitable as binder fibers are bicomponent fibers having a relatively low melting polymer binder component and a higher melting polymer strength component.

BRIEF DESCRIPTION OF THE DRAWINGS

Some of the features and advantages of the invention having been stated, others will be apparent as the description proceeds, and taken in connection with the accompanying drawings, in which.

DESCRIPTION OF ILLUSTRATED EMBODIMENTS

Figure 1:
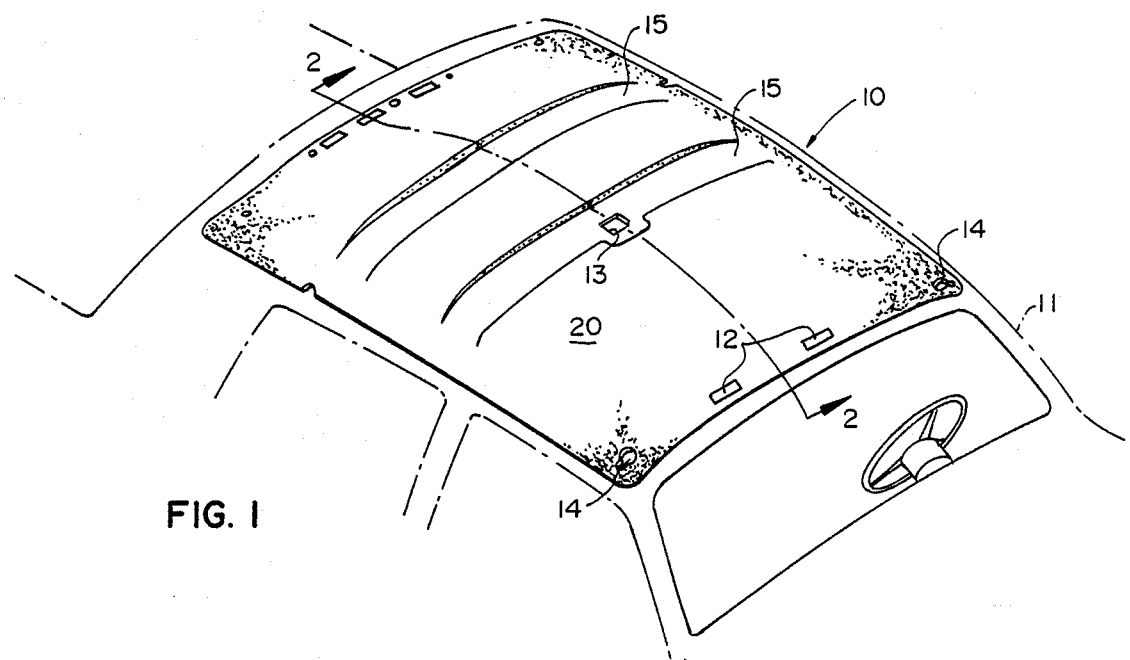
FIG. 1 is a perspective view from above of a headliner in accordance with the present invention, with the broken lines illustrating the environmental setting of the headliner as installed in an automobile.

Referring now more particularly to the drawings, the molded automobile headliner of the present invention is indicated generally by the reference character 10. As shown in FIG. 1, the headliner 10 is mounted to the underside of the roof of an automobile 11 so as to underlie the roof panel of the automobile and present an aesthetically pleasing finished surface to the ceiling of the passenger compartment. The headliner is typically secured to the vehicle roof using fastener strips 12 of the hook-loop type (such a Velcro) and by interior trim strips (not shown) mounted along opposite sides of the headliner. The conventional manner of securement using hook-loop type fastener strips involves securing the hook strips to the underside of the vehicle roof and the loop strips to the exposed upper surface of the headliner. However, in accordance with the present invention the fibrous upper surface of the molded headliner itself may, in some instances, be utilized in lieu of loop strips.

As illustrated, the headliner includes a cut-out or opening 13 for the dome lamp, openings 14 for receiving the mounting hardware for the sunvisors, and various other openings as necessary depending upon body style. However, in some instances it may be desirable to pre-install such hardware as dome lamps, sunvisors, grab handles and the like on the headliner prior to installing the headliner in the vehicle.

Figure 2:
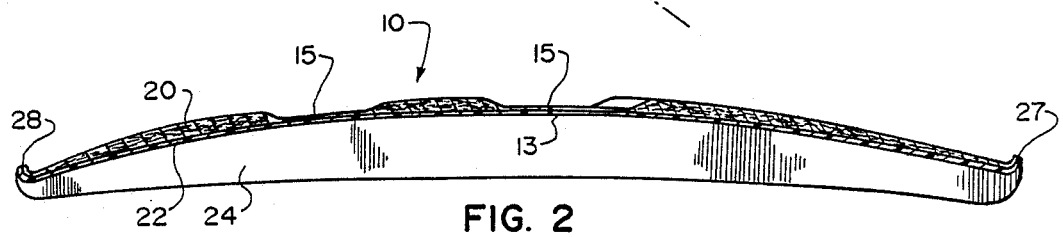
FIG. 2 is a cross-sectional view of the headliner taken substantially along the line 2—2 of FIG. 1.

As best seen in FIGS. 1 and 2, the molded headliner 10 is of non-uniform thickness and includes recessed areas 15 extending transversely of the headliner on the upper surface thereof and conforming to projections on the underside of the vehicle roof formed by structural reinforcing members of the roof. The recessed areas 15 are formed in the headliner during the molding operation by compressing the material of the headliner to a greater extent in these areas so that it is of a reduced thickness relative to other areas of the headliner.

Figure 3:
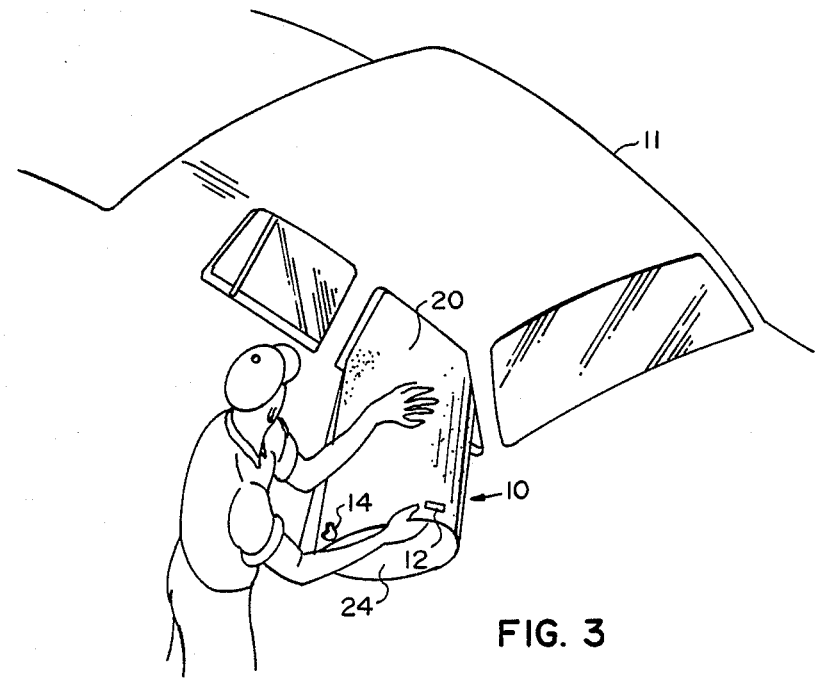
FIG. 3 is a perspective view illustrating how the headliner can be easily installed in the vehicle by flexing or bending the headliner during installation to permit it to pass through a side window of the vehicle.

A very significant feature of the headliner of the present invention which clearly distinguishes it from the conventional headliner constructions of the prior art is the highly flexible and resilient nature of the headliner. Unlike the prior art rigid foam or fiberglass headliners, the headliner of the present invention is so highly deformable and resilient that it can be bent or flexed nearly double to facilitate installation in the automobile. This is illustrated in FIG. 3, where it will be seen that the headliner has been flexed or bent longitudinally into a generally U-shaped configuration to permit the headliner to pass through the front passenger side window of the automobile. After positioning the headliner within the vehicle, the headliner will resiliently recover to its original molded shape. It can then be properly positioned and secured to the roof of the vehicle.

Persons familiar with the problems encountered during the installation of the rigid headliners of the prior art will readily recognize that the deformability and resiliency of the headliner of the present invention provides very significant advantages over the prior rigid headliners, not only in reduction of breakage, but in ease of installation. It also provides greater latitude during the assembly process as to when the headliner can be installed. Typically, the rigid headliners must be installed in the vehicle prior to installation of the windshield and/or rear window, since an opening of this large size is required for installation of the headliner. By contrast, the headliner of the present invention can be passed through the rolled down passenger window, which permits the headliner to be installed either before or after installation of the window glass in the automobile assembly plant. This also means that the headliner of the present invention is especially advantageous in the event it should ever be necessary to replace a headliner in an automobile, since this can be accomplished without the necessity of removing an window glass.

The advantageous deformability and resiliency characteristics of the headliner of the present invention are achieved by forming the headliner as a textile-based product comprising a batt of polymeric fibers which are compressed and molded into the desired contoured concave shape. The fibers of the batt are bonded together at a multiplicity of locations, sufficient in number to impart to the panel a self-supporting molded rigidity which allows the headliner to retain its shape in the installed condition in the vehicle. However, the molded bonded batt of fibers remains highly deformable and resilient. Preferably, the polymeric fibers which comprise the batt are formed of a thermoplastic polymer, and the fibers are thermally fused to one another at the fiber cross-over points. Examples of such thermoplastic polymers include homopolymers and copolymers of polyester, nylon, polyethylene, polypropylene and blends of fibers formed from these polymers and copolymers. Presently preferred are fibers formed from polyesters such as polyethylene terephthalate (PET). In order to provide the desired resiliency properties to the headliner, it is also desirable that the polymeric fibers have an elongation of at least 10 percent. In the preferred construction, the bonding of the fibers of the batt is achieved by having at least a portion of the polymeric fibers of the batt comprise potentially adhesive binder fibers. Particularly suitable as potentially adhesive binder fibers are composite or bicomponent fibers having a relatively low melting binder component and a higher melting polymer strength component. Bicomponent fibers of this type are advantageous since the strength component imparts and maintains adequate strength to the fiber while the bonding characteristics are imparted by the low temperature component. A variety of bicomponent fibers of this type are commercially available from various sources. One suitable fiber for use in the present invention is of a sheath-core bicomponent construction wherein the core is formed of a relatively high melting polyethylene terephthalate (PET) polymer and the sheath comprises a PET copolymer having a much lower melting temperature and which exhibits thermoplastic adhesive and thermoformability properties when heated to a temperature of about 170 to 200 degree C. Another suitable bicomponent fiber comprises a high melting polyester core component and a lower melting polypropylene sheath component. Desirably, the headliner comprises about 20 to 100 percent by weight of such sheath-core bicomponent fibers, blended with 0 to 80 percent by weight conventional polyester (PET) fibers.

The size (diameter) of the polymeric fibers of the batt is quite important to obtaining acceptable sound absorption and deadening properties. It has been found that when the batt is formed of polymeric fibers having a denier per filament within the range 3 to 20 are used, sound absorption properties are achieved comparable to that provided by the resin impregnated fiber glass headliners of the prior art. The molded batt of fibers typically has an average basis weight of about 18 to about 60 ounces of square yard. In order to facilitate processing in conventional textile blending, carding, crosslapping and needling machinery, the textile fibers should desirably have a staple length of from about 1 to about 5 inches.

Figure 7:
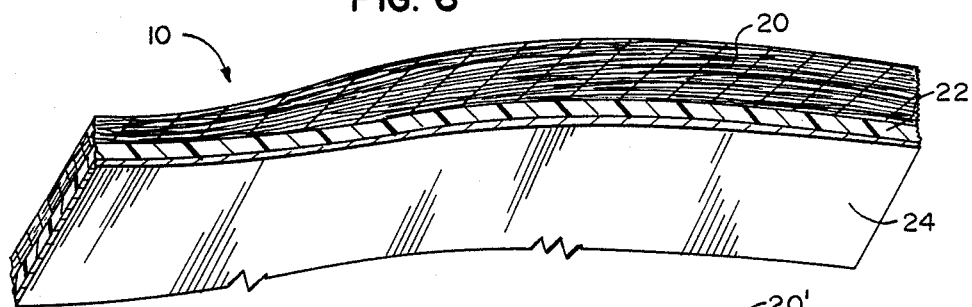
FIG. 7 is a detailed fragmentary cross-sectional view showing a headliner in accordance with one embodiment of the invention.

A molded headliner in accordance with a preferred embodiment of the invention is shown in cross section in FIG. 7. As illustrated, the headliner includes a batt of textile fibers 20, a thin surfacing layer of a flexible foam 22 bonded to the interior surface of the batt 20 and a textile fabric layer 24 bonded to the foam layer 22 and defining the interior surface of the headliner. The thin foam layer 22 serves to mask and smooth any surface irregularities which may be present in the batt 20 and to contribute to the acoustical properties of the headliner, while providing an aesthetically pleasing soft surface to the interior surface of the headliner.

Figure 8:
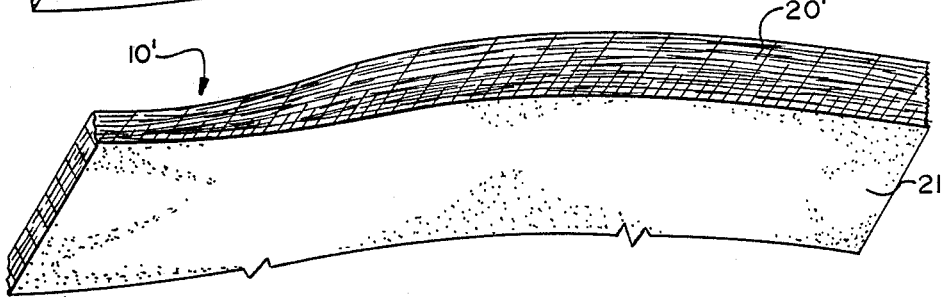
FIG. 8 is a view similar to FIG. 7 showing an alternative embodiment.

A headliner in accordance with an alternate embodiment of the invention is shown in FIG. 8, and is indicated generally by the reference character 10'. In this embodiment, the headliner is formed solely by the batt of fibers 20'. The innermost surface of the batt 20' is comprised of textile fibers which have been fused and bonded into a desired smooth or textured surface. This surface may be dyed or printed to provide a desired color and/or pattern at the surface. Alternatively, precolored fibers may be used at the surface to give the headliner a desired color appearance. The fibers which form the exposed surface 21 of the batt may be of a different composition from those located interiorly of the batt 20', and may for example comprise fibers having a greater tendency to fuse and/or flow to form a film.

Figure 9:
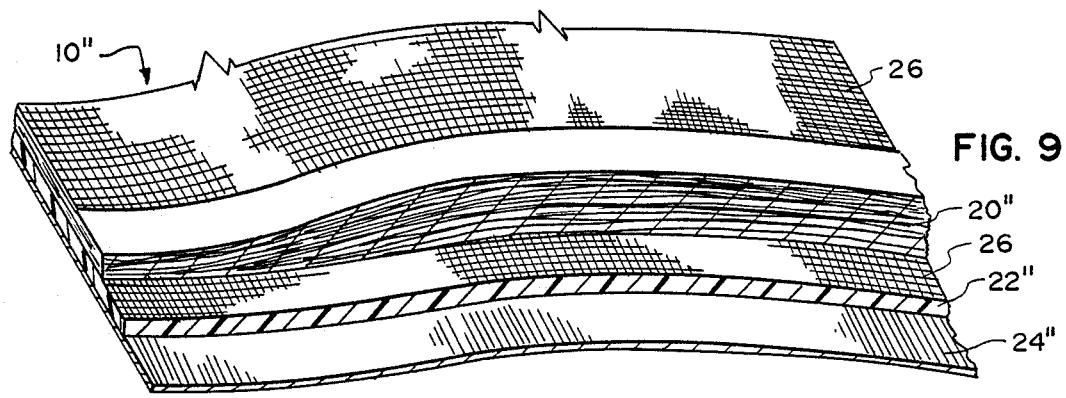
FIG. 9 is a perspective view with parts broken away showing still another embodiment of a headliner in accordance with the invention.

FIG. 9 illustrates another embodiment of a headliner in accordance with the present invention, represented generally by the reference character 10". This construction is similar in many respects to that of FIG. 7, except that an additional scrim layer 26 is provided overlying the inner and outer surfaces of the molded batt 10". The scrim layers 24 help to impart additional stiffness and shape retention to the batt.

If desired, added stiffness can be imparted to headliners in accordance with any of the foregoing embodiments by coating or spraying one surface with a stiffening agent, such as a moldable latex composition, or a thermosetting resin.

As best seen in FIG. 2, the front edge 27 and the rear edge 28 of the headliner has a sharp bend or offset formed therein so that the raw edge of the headliner is hidden from view when the headliner is installed in the automobile. This presents a neat, finished appearance to the headliner in these areas. This offset is obtainable because of the high degree of moldability and formability of the batt. In the rigid headliners of the prior art, a sharp bend or offset of this type cannot be formed because of the brittleness of the headliner, and it has been necessary to overlap the covering fabric around the cut edge of the glass batt in order to provide a finished edge treatment. This type of treatment is difficult and expensive to produce—and the need for such an edge treatment is avoided in the present invention by providing the upturned formed edge. As is also apparent from FIG. 2, the headliner has an overall concave curved shape when viewed from the finished interior side thereof which conforms to the roof line of the automobile.

Figure 4:
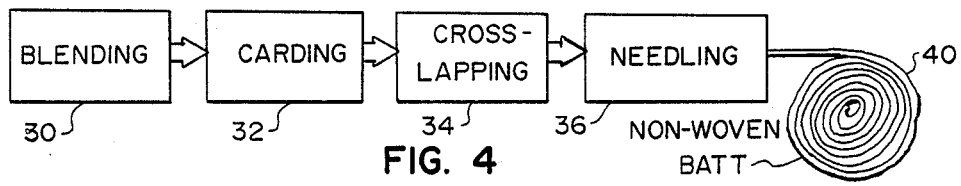
FIGS. 4 and 5 are schematic views illustrating a suitable process for producing the headliner.

FIG. 4 schematically illustrates the steps involved in producing the non-woven batt from which the headliners of the present invention are formed. Preferably, the fibers used in forming the batt are textile staple fibers, and they are blended together as indicated at 30 using conventional textile blending machinery. The blended fibers are then formed into a web by suitable web-forming equipment, such as by air-laying, garnetting or as indicated at 32, by carding. To build up the desired thickness and basis weight, the web may be then crosslapped, as indicated at 34, using conventional crosslapping machinery. The thus formed web is then optionally subjected to a needling operation 36, during which the batt is needle punched lightly to form a coherent self-sustaining batt of sufficient stability to permit it to be subsequently handled and formed into a roll 40. Alternatively, the web may be heat stabilized by passing heated air or steam through the batt.

Figure 5:
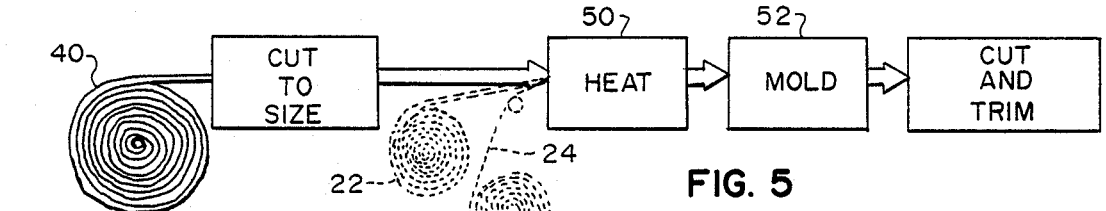

As illustrated in FIG. 5, the roll 40 is thereafter unrolled and cut to size, and optionally combined with a foam layer 22 and a fabric surface layer 24. These materials are placed in a heated oven and heated at a temperature and for a time sufficient to activate the potentially adhesive characteristics of the thermoplastic binder fibers. The heated fibrous batt is then molded, as indicated at 52, into the desired contoured configuration. After the batt has cooled sufficiently, it is removed from the mold and thereafter cut and trimmed into the finished size. An alternative fabrication method involves placing the batt in the mold without preheating and heating the batt to the fusion and molding temperature by forcing heated air or steam through the batt while it is in the mold.

In building up the batt on the crosslapper 34, several layers of fibers are deposited. It may, in some instances, be desirable to use different types and/or sizes of fibers in different layers. For example, a batt may be produced using four or five layers of fibers, with the outer layers comprising a 75/25 blend of binder fibers and conventional fibers, and with the inner layers comprising a 50/50 blend of binder fibers and conventional fibers. It is also possible to alter the denier as well as the composition of the fibers in different layers.

Figure 6:
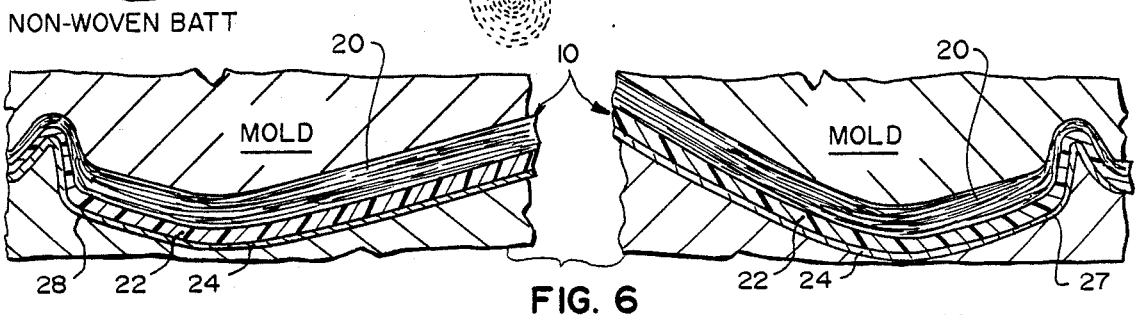
FIG. 6 is a fragmentary cross-sectional view showing how the headliner is molded.

FIG. 6 illustrates how the offset edges are produced at each side of the headliner. As illustrated, the cooperating halves of the mold are shaped in such a way as to form a sharp reverse bend or V-shaped configuration in the molded product. The molded product is subsequently cut along the line indicated by the broken line to thereby form in the finished product an offset edge which hides from view the raw cut edge of the headliner.

The highly deformable and resilient properties of the textile fiber based headliner of the present invention, in contrast to the brittleness of conventional glass fiber headliners, is vividly illustrated by a standard test method, the cantilever beam stiffness test (ASTM D-747). This test is performed on a Tinius Olsen stiffness tester. A test sample is placed in the jaws of the stiffness tester and is bent over a fulcrum at various angles. The force required to deflect the sample to a certain angle is recorded.

Table I illustrates the results of testing a 0.51 inch thick molded headliner in accordance with the present invention (formed of a blend of 25 percent conventional polyethylene terephthalate fibers and 75 percent sheath/core PET copolymer/PET homopolymer binder fibers). For purposes of comparison, a resin bonded glass fiber headliner of comparable thickness 0.52 inch) of the type used in commercial automobile production was tested under similar conditions.

TABLE I

| | Cantilever Stiffness Test | |
|---|---|---|
| | Load Scale Reading (% of maximum bending movement) | |
| Bending Angle (Degrees) | Sample 1 .51" PET (the invention) | Sample 2 .52" fiberglass (control) |
| 3 | 9 | 6 |
| 6 | 16 | 9 |
| 9 | 21 | 13 |
| 12 | 27 | 16 |
| 15 | 33 | 19 |
| 18 | 39 | 22 |
| 20 | 42 | 12 |
| 25 | 51 | 12 |
| 30 | 56 | 12 |

As shown in Table I, for Sample 1 (the invention) the deflection load continually increased through bending angles in excess of 20 degrees and as high as 30 degrees. This illustrates the deformability and resiliency of the headliner of the present invention. In contrast, for sample 2 (the glass fiber control) the deflection load increased through increasing angles up to 18 degrees. However, at about 20 degrees the sample yielded or broke, and the deflection load dropped and no further increase in deflection load was observed at deflection angles of 20 degrees and higher. Tests were made with comparative samples of other thicknesses and similar results were observed. For molded headliners in accordance with the present invention, it was consistently observed that the deflection load increases as a function of deflection angle at a deflection angle of 25 or even 30 degrees. The glass fiber controls typically yielded or broke altogether when subjected to bending angles in excess of about 20 degrees.

That which we claim is:

1. A vehicle headliner adapted to be mounted adjacent a vehicle roof so as to underlie the roof and shield the same from view, and characterized by being of a highly deformable, resilient construction to facilitate installation in the vehicle and by providing excellent sound absorption properties, said headliner comprising a panel formed of a batt of polymeric fibers compressed and molded into a predetermined contoured concave shape, and having an elastic memory of the molded shape, the fibers of said batt being bonded together at a multiplicity of locations to impart to the panel a self-supporting molded rigidity to allow the headliner to retain its shape in the installed condition in the vehicle, yet rendering the panel highly deformable and resilient to allow it to be flexed or bent during installation and to thereafter resiliently recover to its original molded shape.

2. A vehicle headliner according to claim 1 wherein said polymeric fibers are formed of a thermoplastic polymer and are thermally fused to one another at said multiplicity of locations.

3. A vehicle headliner according to claim 1 wherein said polymeric fibers comprise thermoplastic fibers having an elongation of at least 10 percent.

4. A vehicle headliner according to claim 1 wherein at least a portion of the polymeric fibers of said batt comprise potentially adhesive binder fibers.

5. A vehicle headliner according to claim 4 wherein said potentially adhesive binder fibers comprise composite fibers having a relatively low melting polymer binder component and a higher melting polymer strength component, and wherein the fibers in said batt are bonded together at said multiplicity of locations by said composite fibers.

6. A vehicle headliner according to claim 1 wherein said polymeric fibers have a denier per filament of 3 to 20.

7. A vehicle headliner according to claim 1 characterized in that the deflection load increases as a function of deflection angle through a deflection angle of at least 25 degrees.

8. A vehicle headliner according to claim 7 wherein the deflection load increases as a function of deflection angle through a deflection angle of 30 degrees.

9. A vehicle headliner according to claim 1 additionally including a relatively thin layer of foam overlying said molded batt of fibers, and a fabric layer overlying said foam layer and forming the exposed interior surface of the headliner.

10. A vehicle headliner according to claim 1 additionally including a scrim bonded to the interior and exterior surfaces of said batt of fibers for imparting additional stiffness to the headliner.

11. A vehicle headliner according to claim 1 wherein the exposed interior surface of the headliner is comprised of the same fibers which form said batt.

12. A vehicle headliner according to claim 1 wherein said batt of polymeric fibers includes a plurality of layers of fibers, with the fibers at the surface of the batt having different physical characteristics from the fibers located interiorly of the batt.

13. A vehicle headliner according to claim 1 wherein the fibers at the surface of said batt comprise pre-colored fibers.

14. A vehicle headliner according to claim 1 wherein the exterior surface of the headliner which is positioned adjacent the vehicle roof includes molded-in recessed areas of reduced thickness adapted to receive projecting structural members in the vehicle roof.

15. A vehicle headliner adapted to be mounted adjacent a vehicle roof so as to underlie the roof and shield the same from view, and characterized by being of a highly deformable, resilient construction to facilitate installation in the vehicle and by providing excellent sound absorption properties, said headliner comprising a panel formed of a batt of polymeric fibers compressed and molded into a predetermined contoured concave shape of varying thickness, and having an elastic memory of the molded shape, the polymeric fibers of said batt comprising a blend of relatively high melting thermoplastic polymer fibers and relatively low melting potentially adhesive thermoplastic binder fibers forming a multiplicity of fiber-to-fiber bonds at the fiber intersections to impart to the panel self-supporting molded rigidity to allow the headliner to retain its shape in the installed condition in the vehicle yet rendering the panel highly deformable and resilient to allow it to be flexed or bent during installation and to thereafter resiliently recover to its original molded shape.

16. A vehicle headliner according to claim 15 wherein said polymeric fibers have a denier per filament of 3 to 20 and said batt of fibers has a basis weight of 18 to 60 ounces per square yard.

17. A vehicle headliner adapted to be mounted adjacent a vehicle roof so as to underlie the roof and shield the said from view, and characterized by being of a highly deformable, resilient construction to facilitate installation in the vehicle and by providing excellent sound absorption properties, said headliner comprising a panel formed of a batt of polymeric fibers compressed and molded into a predetermined contoured concave shape of varying thickness, and having an elastic memory of the molded shape, the polymeric fibers of said batt having a denier per filament of 3 to 20 and comprising about 20 to 100 percent sheath-core composite fibers having a core component formed of a reaatively high melting polymer and a sheath component polymer formed of a relatively low melting thermoplastic binder polymer forming multiplicity of fiber-to-fiber bonds at the fiber intersections to impart to the panel a self-supporting molded rigidity to allow the headliner to retain its shape in the installed condition in the vehicle yet rendering the panel highly deformable and resilient to allow it to be flexed or bent during installation and to thereafter resiliently recover to its original molded shape.

18. A vehicle headliner adapted to be mounted adjacent a vehicle roof so as to underlie the roof and shield the same from view, and characterized by being of a highly deformable, resilient construction to facilitate installation in the vehicle and by providing excellent sound absorption properties, said headliner comprising a panel formed of a batt of polymeric fibers compressed and molded into a predetermined contoured concave shape of varying thickness, and having an elastic memory of the molded shape, the polymeric fibers of said batt comprising a blend of relatively high melting thermoplastic polymer fibers and relatively low melting potentially adhesive thermoplastic binder fibers forming a multiplicity of fiber-to-fiber bonds at the fiber intersections to impart to the panel a self-supporting molded rigidity to allow the headliner to retain its shape in the installed condition in the vehicle yet rendering the panel highly deformable and resilient to allow it to be flexed or bent during installation and to thereafter resiliently recover to its original molded shape; a thin layer of foam overlying the interior surface of said molded batt of fibers; and a fabric layer overlying said foam layer and forming the exposed interior surface of the headliner.

19. A vehicle headliner adapted to be mounted adjacent vehicle roof so as to underlie the roof and shield the same from view, and characterized by being of a highly deformable, resilient construction to facilitate installation in the vehicle and by providing excellent sound absorption properties, said headliner comprising a panel of a generally rectangular configuration and of a contoured, concave shape, said panel having a substantially smooth lower surface and having an upper surface with recesses formed therein for receiving structural members of the vehicle roof, and said panel having opposing generally parallel side edges of tapered thickness adapted to extend along the sides of the vehicle roof and to be engaged by automotive body trim for holding the headliner in its installed position, and wherein said panel is formed of a batt of polymeric fibers compressed and molded into a predetermined contoured concave shape, and having an elastic memory of the molded shape, the fibers of said batt being bonded together at a multiplicity of locations to impart to the panel a self-supporting molded rigidity to allow the headliner to retain its shape in the installed condition in the vehicle yet rendering the panel highly deformable and resilient to allow it to be flexed or bent during installation and to thereafter resiliently recover to its original shape.

20. A vehicle headliner according to claim 19 wherein said side edges of tapered thickness are offset from the interior surface of the headliner so that the edge is shielded from view.

21. A vehicle having a roof, and in combination therewith, a vehicle headliner mounted adjacent said vehicle roof so as to underlie the roof and shield the same from view, and characterized by said headliner being of a highly deformable, resilient construction to facilitate installation in the vehicle and by providing excellent sound absorption properties, said headliner comprising a panel formed of a batt of polymeric fibers compressed and molded into a predetermined contoured concave shape, and having an elastic memory of the molded shape, the fibers of said batt being bonded together at a multiplicity of locations to impart to the panel a self-supporting molded rigidity to allow the headliner to retain its shape in the installed condition in the vehicle yet rendering the panel highly deformable and resilient to allow it to be flexed or bent during installation and to thereafter resiliently recover to its original molded shape.

22. The combination according to claim 21 additionally including a relatively thin layer of foam overlying the interior surface of said molded batt of fibers, and a fabric layer overlying said foam layer and forming the exposed interior surface of the headliner.

23. A vehicle having a roof and structural members extending therebeneath and supporting the roof, and in combination therewith, a vehicle headliner mounted adjacent the underside of said vehicle roof so as to underlie the roof and shield the same from view, and characterized by said headliner being of a highly deformable, resilient construction to facilitate installation in the vehicle and by providing excellent sound absorption properties, and said headliner comprising a panel of a generally rectangular configuration and of a contoured, concave shape, said panel having a substantially smooth and lower surface and having an upper surface with recesses formed therein for receiving said structural members of the vehicle roof, and said panel having opposing generally parallel side edges of tapered thickness extending along the sides of the vehicle roof so as to be engaged by automotive body trim for holding the headliner in its installed position, and wherein said panel is formed of a batt of polymeric fibers compressed and molded into a predetermined contoured concave shape, the fibers of said batt being bonded together at a multiplicity of locations to impart to the panel a self-supporting molded rigidity to allow the headliner to retain its shape in the installed condition in the vehicle yet rendering the panel highly deformable and resilient to allow it to be flexed or bent during installation and to thereafter resiliently recover to its original shape.

24. A method of installing a vehicle headliner in a vehicle which comprises providing a relatively flat deformable and resilient headliner of a configuration adapted to be mounted adjacent the interior of a vehicle roof, flexing the headliner into a more compact configuration and maintaining the headliner in said configuration while inserting the thus flexed headliner through a window opening into the interior of the vehicle, releasing the headliner and allowing it to recover to its original opened and relatively flat configuration; and securing the headliner to the vehicle.

25. A method according to claim 24 wherein said step of providing a headliner comprises providing a headliner formed from a batt polymeric fibers compressed and molded into predetermined contoured concave shape, and having an elastic memory of the molded shape, and a self-supporting molded rigidity to allow the headliner to retain its shape in the installed vehicle, yet rendering the headliner highly deformable and resilient.

* * * * *

UNITED STATES PATENT AND TRADEMARK OFFICE
CERTIFICATE OF CORRECTION

PATENT NO. : 4,840,832
DATED : June 20, 1989
INVENTOR(S) : Paul L. Weinle, et al.

It is certified that error appears in the above-identified patent and that said Letters Patent is hereby corrected as shown below:

Column 3, line 55, "an" should be -- any --.

Column 8, line 31, after the word "panel" insert -- a --.

Column 8, line 43, "said" should be -- same --.

Column 8, line 53, "reaatively" should be
 -- relatively --.

Column 8, line 56, after "forming" insert -- a --.

Signed and Sealed this

Thirteenth Day of March, 1990

Attest:

JEFFREY M. SAMUELS

Attesting Officer     Acting Commissioner of Patents and Trademarks